United States Patent [19]

Zrimsek

[11] Patent Number: 4,528,715
[45] Date of Patent: Jul. 16, 1985

[54] WIPER BLADE BACKING STRIP

[75] Inventor: Edward L. Zrimsek, Brecksville, Ohio

[73] Assignee: Superior Roll Forming Co., Ohio

[21] Appl. No.: 606,882

[22] Filed: May 3, 1984

[51] Int. Cl.³ .............................................. B60S 1/38
[52] U.S. Cl. .............................................. 15/250.42
[58] Field of Search ........................ 15/250.36–250.42

[56] References Cited

U.S. PATENT DOCUMENTS

| | | | |
|---|---|---|---|
| 2,667,656 | 2/1954 | Oishei | 15/250.42 |
| 2,713,695 | 7/1955 | Oishei | 15/250.42 X |
| 2,760,220 | 8/1956 | Deibel | 15/250.42 |
| 2,781,539 | 2/1957 | Oishei | 15/250.42 |
| 4,342,129 | 8/1982 | Thompson | 15/250.42 X |
| 4,473,919 | 10/1984 | Fritz, Jr. | 15/250.36 X |

Primary Examiner—Peter Feldman
Attorney, Agent, or Firm—Yount & Tarolli

[57] ABSTRACT

A roll formed wiper blade backing strip is disclosed having a base member with two longitudinal parallel edges. Each longitudinal edge has a roll formed reinforcing edge integral with the base member. The rolled reinforced edge members are connected to and integrally formed with reinforcing members overlying the base member and extending inwardly from each longitudinal edge toward the center line of the base member. Claws are integrally formed with and extend from the reinforcing members to hold the wiper blade. The claws have directly opposed surfaces. The base member, rolled reinforcing edges, reinforcing members and claws are roll formed into an integral unit from a single sheet of deformable material, such as metal.

5 Claims, 4 Drawing Figures

WIPER BLADE BACKING STRIP

FIELD OF INVENTION

This invention relates to windshield wipers, and more particularly, to a windshield wiper blade backing strip.

BACKGROUND OF INVENTION

One type of commonly used wiper blade backing strip is illustrated in FIG. 4 of Tilli U.S. Pat. No. 3,881,213. That wiper blade backing strip has opposed, but alternating, claws to grip and hold a wiper blade. One deficiency with that type of wiper blade and backing strip is that the back and forth motion of a windshield wiper can alternately unthread or unweave the wiper blade from the backing strip. The alternating motion of the windshield wiper unhooks the wiper blade alternately from the opposing, but offset claws.

Directly opposed claws, as illustrated in FIG. 5 of Tilli U.S. Pat. No. 3,881,213, help alleviate the unweaving or unthreading problem noted above. See also Oishei U.S. Pat. No. 2,724,139 and Scinta Pat. No. 2,649,605.

Regardless of whether a wiper blade in the prior art had directly opposed or alternating claws, a problem still existed in economically producing by stamping a wiper blade backing strip having some type of reinforcing means. The reinforcing means would be desirable to give the wiper blade backing strip added strength and resiliency, but such reinforcing members cannot be economically produced by stamping.

SUMMARY OF INVENTION

The present invention is directed to a roll formed wiper blade backing strip having a base member with two longitudinal parallel edges. Each longitudinal edge has a roll formed reinforcing edge integral with the base member. The rolled reinforced edge members are connected to and integrally formed with reinforcing members overlying the base member and extending inwardly from each longitudinal edge toward the center line of the base member. Claws are integrally formed with and extend from the reinforcing members to hold the wiper blade. The claws have directly opposed surfaces. The base member, rolled reinforcing edges, reinforcing members and claws are roll formed into an integral unit from a single sheet of deformable material, such as metal.

In a preferred form, the claws comprise two rows of oppositely spaced claw elements with a space between adjacent claw elements in each row. The claws extend upwardly from the reinforcing members and inwardly in an inverted L-shaped form toward a plane passing through the center line of the base member.

The wiper blade backing strip can also be provided with an end clip to prevent lengthwise movement of the wiper blade. Additionally, the base member can be provided with a longitudinal extending strengthening rib along the center line, such as a depression or deformation in the base member.

BRIEF DESCRIPTION OF DRAWINGS

Other purposes, objects and advantages will appear from the following description of a preferred embodiment in the drawings wherein.

DESCRIPTION OF PREFERRED EMBODIMENT

Figure 1:
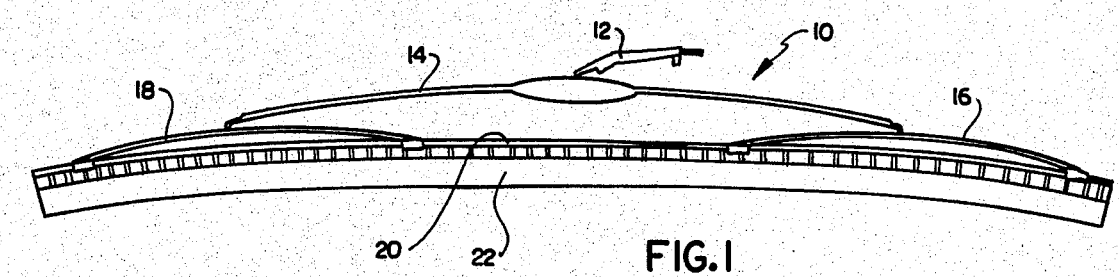
FIG. 1 is a side elevational view of a wiper blade yoke, backing strip and wiper blade.

Referring to FIG. 1, a wiper blade assembly 10 is shown connected to connecting arm 12. The supporting members in FIG. 1 comprise a triple yoke having a primary yoke 14 which is in turn connected at either end to secondary yokes 16 and 18. The secondary yokes 16 and 18 are fastened to the wiper blade backing strip 20 of the present invention. The wiper blade 22 is secured within the wiper blade backing strip 20 as described in more detail below. A wiper blade backing strip 20 of the present invention is designed to be used with a variety of different supporting members 14, 16, and 18, the triple yoke of FIG. 1 being merely illustrative.

Figure 2:
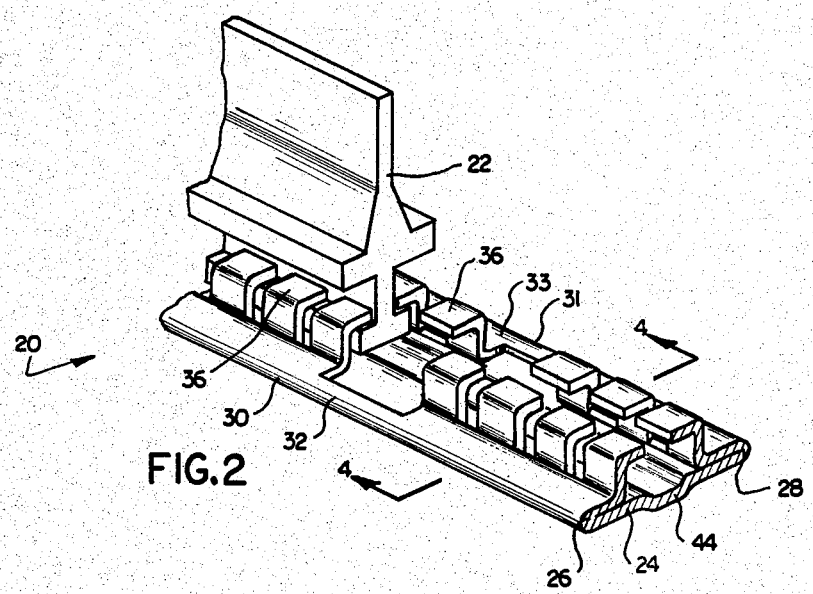
FIG. 2 is a pictorial view of a portion of the wiper blade backing strip of the present invention with a portion of the wiper blade held therein.
Figure 4:
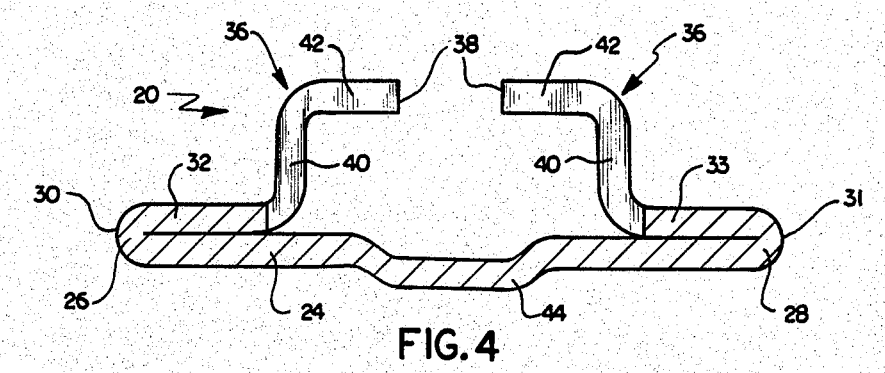
FIG. 4 is a cross sectional view along lines 4—4 of FIG. 2.

With reference to FIGS. 2 and 4, the wiper blade backing strip 20 of the present invention will now be described in more detail. The wiper blade backing strip 20 has a base member 24 which in its preferred form is depicted as a rectangle whose length is much greater than its width. The base member 24 has two longitudinally parallel edges 26, 28. The longitudinally extending parallel edges 26, 28 are parallel to a center line of the base member 24. Each longitudinally extending edge 26, 28 has a roll formed reinforcing edge 30, 31 integral with the base member 24.

Reinforcing members 32-33 (i) are integral with the roll formed reinforcing edges 30, 31, (ii) overlie the base member and (iii) extend inwardly from each of the longitudinal edges 26, 28. The reinforcing members 32, 33 extend inwardly toward the center line of the base member 24.

A plurality of claws 36 are integral with and extend from the reinforcing members 32, 33; the claws 36 are designed to hold the wiper blade 22 in place. As best seen in FIG. 2 and in FIG. 4, the claw members 36 have opposed surfaces 38 which are directly opposite one another for holding a portion of the wiper blade 22. The claw members 36 comprise two rows of oppositely spaced claw elements with a space between adjacent claw elements in each row. In the preferred form, the claws have an upwardly extending portion 40 (FIG. 4) which is integral with the reinforcing members 32, 33 and extends generally perpendicular therefrom to the base member 24. Attached to the upstanding members 40 of the claw members 36 is a generally inwardly and horizontally directed element 42 which terminates at the opposed surfaces 38. The claws 36 comprise two rows of oppositely spaced claw elements with a space between adjacent claw elements in each row. The claws extend upwardly from the reinforcing members and inwardly in an inverted T-shaped form toward a plane passing through the center line of the base member.

The wiper blade 22 may take a variety of configurations, and in the form shown in FIG. 2, the wiper blade 22 comprises an inverted T in its pertinent portion, wherein the base of the T is clamped between the claw members 36.

The preferred form of the present invention may also be provided with a strengthening rib 44 which is a deformation or depression in the base member 24 and formed along the center line of the base member.

Figure 3:
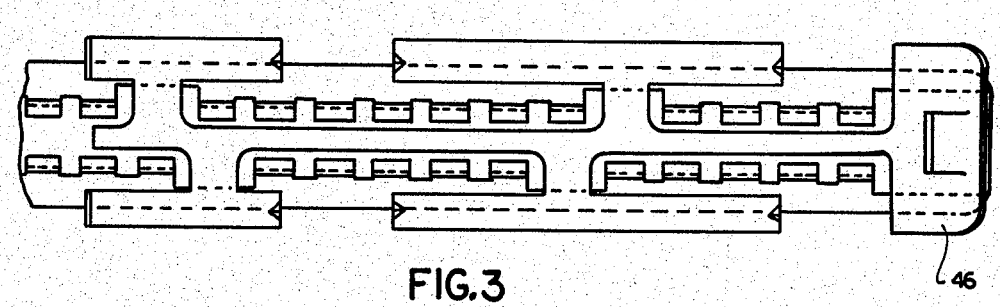
FIG. 3 shows the end of the wiper blade backing strip of the present invention without the wiper blade to illustrate the end clip.

To prevent lengthwise movement of the wiper blade 22 within the channel created by the opposing claws 36 in the wiper blade backing strip 20, an end clip 46, as shown in FIG. 3, is provided. The end clip 46 is secured to the wiper blade backing strip by removing some of the opposed claws at selected locations so that lateral connecting members of the end clip can be secured between the adjacent claw members.

A wiper blade backing strip of the present invention can be formed from any deformable material, metal being preferred. A particular type of preferred metal is Martinsite steel. The thickness of the sheet material used to form the backing strip of the present invention can be of a variety of thicknesses, depending on the size of the backing strip. Generally, a sheet material in the range of about 0.015 inches to about 0.040 inches is preferred, with a thickness of about 0.023 inches having been used and performed satisfactorily.

A significant advantage and feature of the present invention is that the wiper blade backing strip 20 is an integrally formed unit from a single sheet of deformable material. The wiper blade backing strip 20 is formed by a roll forming process. The base member 24, the roll formed reinforcing edges 26, 28, the reinforcing members 32, 33 and the opposed claws 36 are formed as an integral unit by roll forming a stamped single sheet of deformable material into the shape depicted in FIGS. 2 and 4.

One advantage of the present invention is that the roll forming process can be used to create the roll formed reinforcing edges 30, 31. The roll formed reinforcing edges together with the longitudinally extending reinforcing members 32, 33 provide a double thickness of material to give the wiper blade backing strip 20 flexibility and stiffness needed in different weather conditions, particularly ice. The double metal thickness is created by tightly rolling portions of the original sheet material over on itself to create the overlying reinforcing members 32, 33 and the rolled edges 30 and 31. Thus, a backing strip is created which will bend and spring back to a normal position and also conform to the changing contour of the face and side curves of the windshied.

The reinforcing edges and members 30, 31, 32 and 33 together with the strengthening rib 44 will evenly distribute the pressure between the pressure points created by the wiper blade yokes, 14, 16, 18. In contrast, the prior art stamped wiper blade backing strips cannot economically achieve the reinforced double metal thickness.

A further advantage of using roll forming to create the wiper blade backing strip of the present invention is that the roll forming process results in a very simple and economical method for forming a backing strip, especially compared to the stamping process currently used for many wiper strips. The roll forming process is also much faster than a stamping process.

Another advantage of the present invention is that the space between adjacent claws provides the wiping blade backing strip with sufficient resilience and flexibility not only to flex and conform to windshield surfaces, but also to provide resilience.

What is claimed is:

1. A roll formed wiper blade backing strip comprising:
   a base member having two longitudinal parallel edges;
   each longitudinal edge having a roll formed reinforcing edge integral with said base member,
   reinforcing members integral with said roll formed reinforcing edges and overlying said base member and extending inwardly from each longitudinal edge toward the center line of said base member,
   said reinforcing members each having a first surface oppositely facing a first surface portion of said base member, substantially the entire area of said first surfaces of said reinforcing members being in contact with said first surface portion of said base member to form a roll formed double material thickness, and
   a plurality of claws integral with and extending from each said reinforcing member to hold a wiper blade, said claws having directly opposed surfaces for holding a wiper blade,
   said base member, roll formed reinforcing edges, reinforcing members and claws forming an integral unit and being roll formed from a single sheet of deformable material.

2. A roll formed wiper blade backing strip as set forth in claim 1 wherein said claws comprise two rows of oppositely spaced claw elements with a space between adjacent claw elements in each row.

3. A roll formed wiper blade backing strip as set forth in claim 2 wherein said claws extend upwardly from said reinforcing members and inwardly to said center line of said base member toward an opposing claw.

4. A roll formed wiper blade backing strip as set forth in claim 1 including an end clip on each end of the wiper blade backing strip, said clip being secured to said backing strip and adapted to prevent lengthwise movement of a wiper blade relative to the backing strip.

5. A roll formed wiper blade backing strip as set forth in claim 1 wherein said base member has a longitudinally extending strengthening rib along the center line of said base member, said strengthening rib comprising a deformation in said base member.

* * * * *